US012354779B2

(12) United States Patent
Grachev et al.

(10) Patent No.: US 12,354,779 B2
(45) Date of Patent: Jul. 8, 2025

(54) MAGNETIC MULTILAYER COMPOSITE AND A METHOD OF FORMING THE SAME

(71) Applicant: SAINT-GOBAIN PERFORMANCE PLASTICS CORPORATION, Solon, OH (US)

(72) Inventors: Sergey Grachev, San Diego, CA (US); Domien Volckaert, Ghent (BE); William C. O'Rourke, La Jolla, CA (US); Robrecht Moerkerke, Kortrijk (BE); Christy De Meyer, San Diego, CA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 342 days.

(21) Appl. No.: 17/932,118

(22) Filed: Sep. 14, 2022

(65) Prior Publication Data

US 2023/0091277 A1 Mar. 23, 2023

Related U.S. Application Data

(60) Provisional application No. 63/261,328, filed on Sep. 17, 2021.

(51) Int. Cl.

*H01F 1/153* (2006.01)
*H01F 27/255* (2006.01)
*H01Q 1/22* (2006.01)

(52) U.S. Cl.

CPC ..... *H01F 1/15308* (2013.01); *H01F 1/15316* (2013.01); *H01F 27/255* (2013.01); *H01Q 1/2225* (2013.01)

(58) Field of Classification Search

CPC .. A61K 31/4365; A61K 31/519; A61K 31/55; A61K 38/095; A61K 45/06;

(Continued)

(56) References Cited

U.S. PATENT DOCUMENTS 8,686,918 B1 4/2014 Diaz
8,773,312 B1 7/2014 Diaz (Continued)

FOREIGN PATENT DOCUMENTS

CN 104134513 A 11/2014
DE 102009023745 A1 3/2010

(Continued)

OTHER PUBLICATIONS

International Search Report and Written Opinion for PCT Application No. PCT/US2022/076410, dated Dec. 28, 2022, 9 pages.

*Primary Examiner* — Thien M Le

(74) *Attorney, Agent, or Firm* — Abel Schillinger, LLP; Chi Suk Kim

(57) ABSTRACT

The present disclosure relates to a magnetic multilayer composite that may include a core substrate layer, an outer magnetic layer overlying a first surface of the core substrate layer, and an inner magnetic layer underlying a second surface of the core substrate layer. The composite may include a magnetic volume ratio $V_M/V_S$ of at least about 0.005, where $V_M$ is equal to the total volume of magnetic material in the composite and $V_S$ is the total volume of substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

20 Claims, 3 Drawing Sheets

(58) Field of Classification Search
CPC ... A61P 13/12; B64C 39/024; B64U 2101/30; G08B 13/196; H01F 1/147; H01F 1/15308; H01F 1/15316; H01F 17/0006; H01F 2017/0066; H01F 27/255; H01Q 1/2225; H04N 7/185
See application file for complete search history.

(56) References Cited

U.S. PATENT DOCUMENTS

| | | | | |
|---|---|---|---|---|
| 8,847,846 | B1 | 9/2014 | Diaz | |
| 9,543,640 | B2 | 1/2017 | Diaz | |
| 9,596,755 | B2 | 3/2017 | Sethumadhavan et al. | |
| 9,634,735 | B2 | 4/2017 | Koujima et al. | |
| 2004/0252417 | A1* | 12/2004 | Hasegawa | G11B 5/3906 360/324.11 |
| 2011/0045319 | A1* | 2/2011 | Hayakawa | G11B 5/7253 428/840 |
| 2014/0016918 | A1* | 1/2014 | Lervik | F17D 1/18 219/643 |
| 2014/0084590 | A1* | 3/2014 | Rhinefrank | H02K 1/28 310/91 |
| 2014/0132387 | A1* | 5/2014 | Shin | H01F 1/33 336/200 |
| 2014/0322561 | A1* | 10/2014 | Uchida | G11B 5/667 428/827 |
| 2015/0109179 | A1 | 4/2015 | Ryu et al. | |
| 2015/0249205 | A1* | 9/2015 | Suwa | H10N 50/10 257/421 |
| 2019/0355500 | A1* | 11/2019 | Lee | H01F 17/0013 |
| 2021/0012952 | A1* | 1/2021 | Francis | H01F 27/2828 |
| 2022/0037078 | A1* | 2/2022 | Yoshioka | H02M 3/003 |

FOREIGN PATENT DOCUMENTS

| | | | |
|---|---|---|---|
| EP | 1450378 | A2 | 8/2004 |
| JP | 2005116763 | A | 4/2005 |
| JP | 2009239131 | A | 10/2009 |
| JP | 4917484 | B2 | 4/2012 |
| JP | 4927625 | B2 | 5/2012 |
| WO | 2023044329 | A1 | 3/2023 |

* cited by examiner

MAGNETIC MULTILAYER COMPOSITE AND A METHOD OF FORMING THE SAME

CROSS-REFERENCE TO RELATED APPLICATION(S)

This application claims priority under 35 U.S.C. § 119(e) to U.S. Provisional Patent Application No. 63/261,328, entitled "MAGNETIC MULTILAYER COMPOSITE AND A METHOD OF FORMING THE SAME," by Sergey GRACHEV et al., filed Sep. 17, 2021, which is assigned to the current assignee hereof and is incorporated by reference herein in its entirety.

FIELD OF THE DISCLOSURE

The present disclosure relates to a magnetic multilayer composite and methods of forming the same.

BACKGROUND

High frequency (HF), very high frequency (VHF) and ultrahigh frequency (UHF) antennas can include soft magnetic materials, which can improve the performance of the antenna. However, the performance of the antennas can be based on the effective magnetic volume of the magnetic materials within the antennas relative to the non-magnetic materials of the antennas. Accordingly, improved composite materials that balance the magnetic materials relative to the non-magnetic materials for use in antennas are desired.

SUMMARY

According to a first aspect, a magnetic multilayer composite may include a core substrate layer, an outer magnetic layer overlying a first surface of the core substrate layer, and an inner magnetic layer underlying a second surface of the core substrate layer opposite of the first surface of the core substrate layer. The composite may include a magnetic volume ratio $V_M/V_S$ of at least about 0.005, where $V_M$ is equal to the total volume of magnetic material in the composite and $V_S$ is the total volume of substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

According to still another aspect, a magnetic multilayer composite may include a core substrate layer, an outer magnetic layer overlying a first surface of the core substrate layer, and an inner magnetic layer underlying a second surface of the core substrate layer opposite of the first surface of the core substrate layer. The composite may include a magnetic layer thickness ratio $T_M/T_S$ of at least about 0.005, where $T_M$ is equal to the total thickness of the outer magnetic layer and the inner magnetic layer and $T_S$ is the total thickness of the substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 MHz to 10 GHz, and Y is greater than 100.

According to another aspect, an antenna may include a magnetic multilayer composite. The magnetic multilayer composite may include a core substrate layer, an outer magnetic layer overlying a first surface of the core substrate layer, and an inner magnetic layer underlying a second surface of the core substrate layer opposite of the first surface of the core substrate layer. The composite may include a magnetic volume ratio $V_M/V_S$ of at least about 0.005, where $V_M$ is equal to the total volume of magnetic material in the composite and $V_S$ is the total volume of substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

According to still another aspect, an antenna may include a magnetic multilayer composite. The magnetic multilayer composite may include a core substrate layer, an outer magnetic layer overlying a first surface of the core substrate layer, and an inner magnetic layer underlying a second surface of the core substrate layer opposite of the first surface of the core substrate layer. The composite may include a magnetic layer thickness ratio $T_M/T_S$ of at least about 0.005, where $T_M$ is equal to the total thickness of the outer magnetic layer and the inner magnetic layer and $T_S$ is the total thickness of the substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

According to yet another aspect, a method of forming a magnetic multilayer composite may include providing a core substrate layer, depositing an outer magnetic layer overlying a first surface of the core substrate layer, and depositing an inner magnetic layer underlying a second surface of the core substrate layer opposite of the first surface of the core substrate layer. The composite may include a magnetic volume ratio $V_M/V_S$ of at least about 0.005, where $V_M$ is equal to the total volume of magnetic material in the composite and $V_S$ is the total volume of substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

According to still another aspect, a method of forming a magnetic multilayer composite may include providing a core substrate layer, depositing an outer magnetic layer overlying a first surface of the core substrate layer, and depositing an inner magnetic layer underlying a second surface of the core substrate layer opposite of the first surface of the core substrate layer. The composite may include a magnetic layer thickness ratio $T_M/T_S$ of at least about 0.005, where $T_M$ is equal to the total thickness of the outer magnetic layer and the inner magnetic layer and $T_S$ is the total thickness of the substrate. The composite may further include a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a magnetic multilayer composite that may include a core substrate layer, an outer magnetic layer overlying a first surface of the core substrate layer and an inner magnetic layer underlying a second surface of the core substrate layer opposite of the first surface of the core substrate layer.

Figure 1:
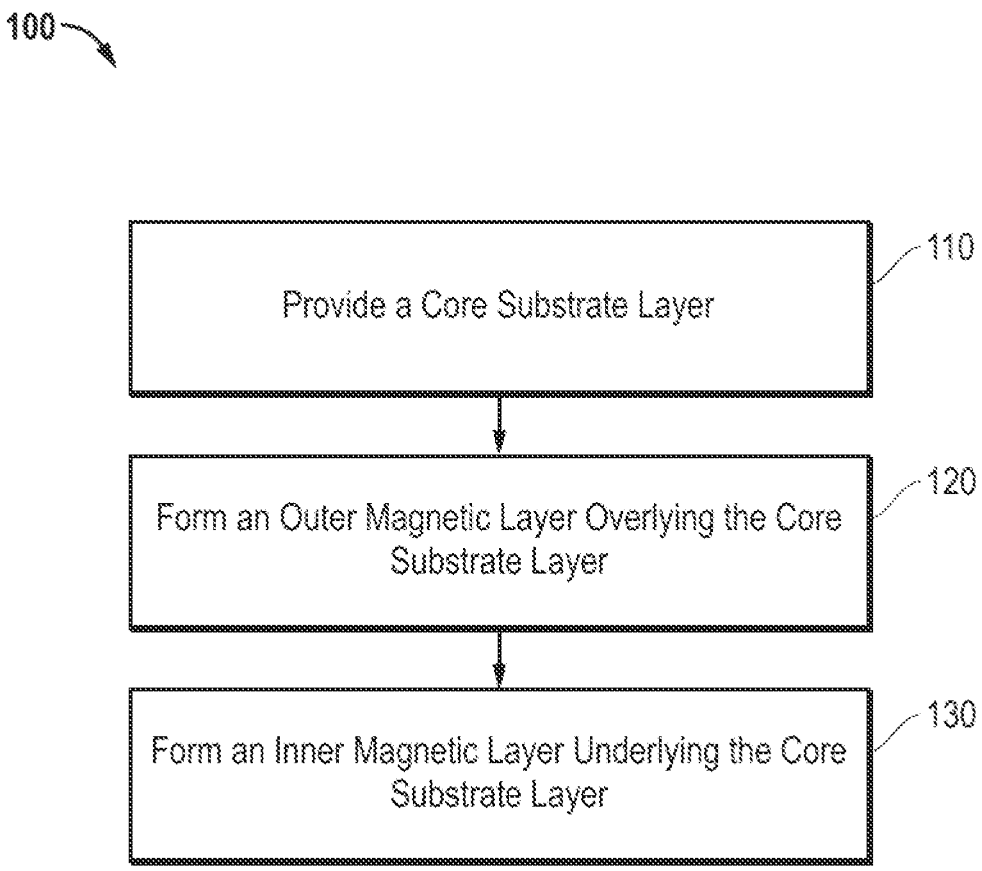
FIG. 1 includes a diagram showing a magnetic multilayer composite forming method according to embodiments described herein.

Referring first to a method of forming a magnetic multilayer composite, FIG. 1 includes a diagram showing a forming method 100 for forming a magnetic multilayer composite according to embodiments described herein. According to particular embodiments, the forming method 100 may include a first step 110 of providing a core substrate layer, a second step 120 of forming an outer magnetic layer overlying a first surface of the core substrate layer, and a third step 130 of forming an inner magnetic layer underlying a second surface of the core substrate layer opposite of the first surface of the core substrate layer.

Figure 2:
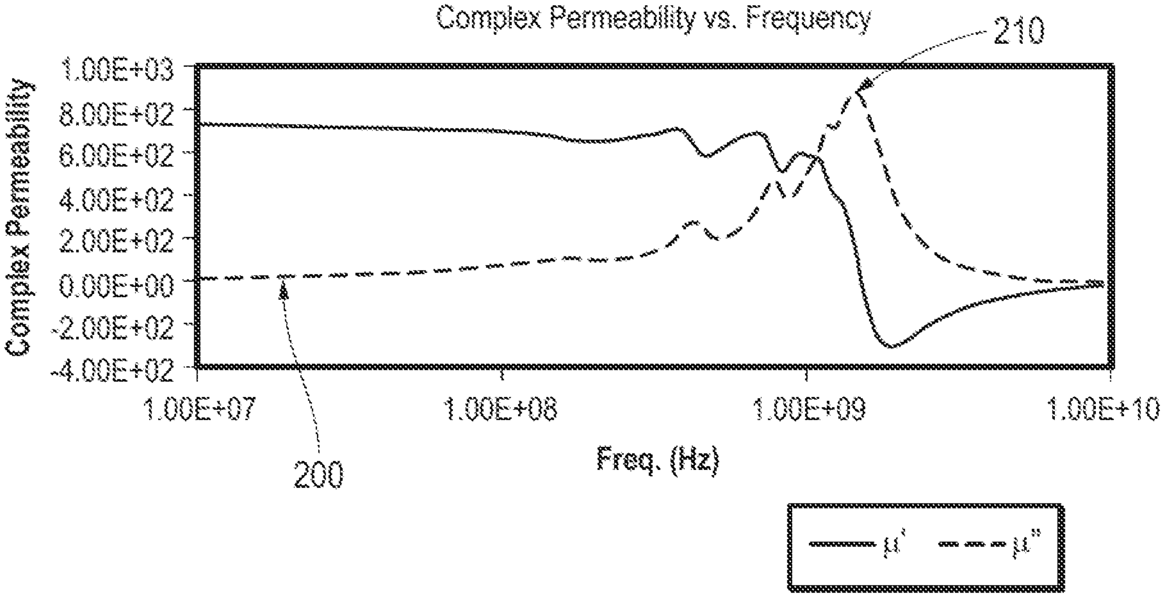
FIG. 2 includes an example plot of the imaginary part of magnetic permeability (μ") of a material plotted as a function of frequency.

For purposes of embodiments described herein, a material may be described as have a particular permeability rating (X, Y). The permeability rating (X, Y) of a given material is defined as the maximum peak point (X, Y) along the plot of the imaginary part of magnetic permeability (μ") of the material plotted as a function of frequency, where X is within the range of 10 MHz to 10 GHz. For purposes of illustration, FIG. 2 shows an example plot 200 of the imaginary part of magnetic permeability (μ") of a material plotted as a function of frequency (Hz) with a maximum peak point 210 (i.e., the permeability rating (X, Y) of the plot 200), where X is within the range of 10 MHz to 10 GHz. For purposes of embodiments described herein, the maximum peak point (X, Y) of the plot 200 is defined as the greatest apex (i.e., the apex with the greatest Y component) of the function. Further, it will be appreciated that a "peak" or "apex" is defined as a maximum point of the function having values increasing to the maximum point and values decreasing from the maximum point.

Referring back to FIG. 1 and the first step 110 of providing a core substrate layer, according to particular embodiments, the core substrate layer may include a plastic material. According to yet other embodiments, the core substrate layer may consist essentially of a plastic material. According to other embodiments, the core substrate layer may be a layer of plastic material.

According to still other embodiments, the core substrate layer may include a polyethylene terephthalate (PET) material. According to yet other embodiments, the core substrate layer may consist essentially of a polyethylene terephthalate (PET) material. According to other embodiments, the core substrate layer may be a layer of polyethylene terephthalate (PET) material.

According to still other embodiments, the core substrate layer may include a polyethylene naphthalate (PEN) material. According to yet other embodiments, the core substrate layer may consist essentially of a polyethylene naphthalate (PEN) material. According to other embodiments, the core substrate layer may be a layer of polyethylene naphthalate (PEN) material.

According to still other embodiments, the core substrate layer may include a polyimide (PI) material. According to yet other embodiments, the core substrate layer may consist essentially of a polyimide (PI) material. According to other embodiments, the core substrate layer may be a layer of polyimide (PI) material.

According to still other embodiments, the core substrate layer may include any combination of a polyethylene terephthalate (PET) material, a polyethylene naphthalate (PEN) material, and a polyimide (PI) material. According to yet other embodiments, the core substrate layer may consist essentially of any combination of a polyethylene terephthalate (PET) material, a polyethylene naphthalate (PEN) material, and a polyimide (PI) material. According to other embodiments, the core substrate layer may be a layer of any combination of a polyethylene terephthalate (PET) material, a polyethylene naphthalate (PEN) material, and a polyimide (PI) material.

According to yet other embodiments, the core substrate layer may have a particular thickness. For example, the core substrate layer may have a thickness of at least about 3 microns, such as, at least about 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or even at least about 100 microns. According to still other embodiments, the core substrate layer may have a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150. It will be appreciated that the thickness of the core substrate layer may be any value between, and including, any of the minimum and maximum values noted above. It will be further appreciated that the thickness of the core substrate layer may be within a range between, and including, any of the minimum and maximum values noted above.

Referring to the first step 120 of depositing an outer magnetic layer overlying a first surface of the core substrate layer, according to particular embodiments, the outer magnetic layer may include a magnetic material. According to other embodiments, the outer magnetic layer may consist essentially of a magnetic material. According to yet other embodiments, the outer magnetic layer may be a layer of magnetic material.

According to yet other embodiments, the outer magnetic layer may include a soft-magnetic material. According to other embodiments, the outer magnetic layer may consist essentially of a soft-magnetic material. According to yet other embodiments, the outer magnetic layer may be a layer of soft-magnetic material.

According to yet other embodiments, the outer magnetic layer may include a ferro-magnetic material. According to other embodiments, the outer magnetic layer may consist essentially of a ferro-magnetic material. According to yet other embodiments, the outer magnetic layer may be a layer of ferro-magnetic material.

According to still other embodiments, the outer magnetic layer may include a cobalt (Co) material. According to yet other embodiments, the outer magnetic layer may consist essentially of a cobalt (Co) material. According to other embodiments, the outer magnetic layer may be a layer of cobalt (Co) material.

According to still other embodiments, the outer magnetic layer may include a cobalt (Co) alloy material. According to yet other embodiments, the outer magnetic layer may consist essentially of a cobalt (Co) alloy material. According to other embodiments, the outer magnetic layer may be a layer of cobalt (Co) alloy material.

According to still other embodiments, the outer magnetic layer may include an iron (Fe) material. According to yet other embodiments, the outer magnetic layer may consist essentially of an iron (Fe) material. According to other embodiments, the outer magnetic layer may be a layer of iron (Fe) material.

According to still other embodiments, the outer magnetic layer may include an iron (Fe) alloy material. According to yet other embodiments, the outer magnetic layer may consist essentially of an iron (Fe) alloy material. According to other embodiments, the outer magnetic layer may be a layer of iron (Fe) alloy material.

According to still other embodiments, the outer magnetic layer may include a nickel (Ni) material. According to yet other embodiments, the outer magnetic layer may consist essentially of a nickel (Ni) material. According to other embodiments, the outer magnetic layer may be a layer of nickel (Ni) material.

According to still other embodiments, the outer magnetic layer may include a nickel (Ni) alloy material. According to yet other embodiments, the outer magnetic layer may consist essentially of a nickel (Ni) alloy material. According to other embodiments, the outer magnetic layer may be a layer of nickel (Ni) alloy material.

According to still other embodiments, the outer magnetic layer may include a permalloy material. According to yet other embodiments, the outer magnetic layer may consist essentially of a permalloy material. According to other embodiments, the outer magnetic layer may be a layer of permalloy material.

According to still other embodiments, the outer magnetic layer may include any combination of a cobalt (Co) material, a cobalt (Co) alloy material, an iron (Fe) material, an iron (Fe) alloy material, a nickel (Ni) material, a nickel (Ni) alloy material, and a permalloy. According to yet other embodiments, the outer magnetic layer may consist essentially of any combination of a cobalt (Co) material, a cobalt (Co) alloy material, an iron (Fe) material, an iron (Fe) alloy material, a nickel (Ni) material, a nickel (Ni) alloy material, and a permalloy. According to other embodiments, the outer magnetic layer may be a layer of any combination of a cobalt (Co) material, a cobalt (Co) alloy material, an iron (Fe) material, an iron (Fe) alloy material, a nickel (Ni) material, a nickel (Ni) alloy material, and a permalloy.

According to yet other embodiments, the outer magnetic layer may have a particular thickness as measured using inductively coupled plasma optical emission spectroscopy. For example, the outer magnetic layer may have a thickness of at least about 0.05 microns, such as, at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns. According to still other embodiments, the outer magnetic layer may have a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0. It will be appreciated that the thickness of the outer magnetic layer may be any value between, and including, any of the minimum and maximum values noted above. It will be further appreciated that the thickness of the outer magnetic layer may be within a range between, and including, any of the minimum and maximum values noted above.

According to yet other embodiments, the outer magnetic layer may have a particular permeability rating (X, Y), where the permeability rating (X, Y) is equal to the peak point (X, Y) along the plot of the imaginary part of magnetic permeability ($\mu''$) of the composite plotted as a function of frequency. For example, the outer magnetic layer may have a permeability rating (X, Y) where X is within the range of 10 MHz to 10 GHz and Y is at least about 100, such as, where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800. According to yet other embodiments, the outer magnetic layer may have a permeability rating (X, Y) where X is within the range of 10 MHz to 10 GHz and Y is not greater than about 5000. It will be appreciated that the permeability rating of the outer magnetic layer may be any value between, and including, any of the minimum and maximum values noted above. It will be further appreciated that the permeability rating of the outer magnetic layer may be within a range between, and including, any of the minimum and maximum values noted above.

According to still other embodiments, depositing the outer magnetic layer may include sputter-deposition, atomic layer deposition, electro-plating, evaporation, chemical vapor deposition and their adaptations, or especially in a roll-to-toll machine.

Referring to the first step 130 of depositing an inner magnetic layer underlying a second surface of the core substrate layer opposite of the first surface of the core substrate layer, according to particular embodiments, the inner magnetic layer may include a magnetic material. According to other embodiments, the inner magnetic layer may consist essentially of a magnetic material. According to yet other embodiments, the inner magnetic layer may be a layer of magnetic material.

According to yet other embodiments, the inner magnetic layer may include a soft-magnetic material. According to other embodiments, the inner magnetic layer may consist essentially of a soft-magnetic material. According to yet other embodiments, the inner magnetic layer may be a layer of soft-magnetic material.

According to yet other embodiments, the inner magnetic layer may include a ferro-magnetic material. According to other embodiments, the inner magnetic layer may consist essentially of a ferro-magnetic material. According to yet other embodiments, the inner magnetic layer may be a layer of ferro-magnetic material.

According to still other embodiments, the inner magnetic layer may include a cobalt (Co) material. According to yet other embodiments, the inner magnetic layer may consist essentially of a cobalt (Co) material. According to other embodiments, the inner magnetic layer may be a layer of cobalt (Co) material.

According to still other embodiments, the inner magnetic layer may include a cobalt (Co) alloy material. According to yet other embodiments, the inner magnetic layer may consist essentially of a cobalt (Co) alloy material. According to other embodiments, the inner magnetic layer may be a layer of cobalt (Co) alloy material.

According to still other embodiments, the inner magnetic layer may include an iron (Fe) material. According to yet other embodiments, the inner magnetic layer may consist essentially of an iron (Fe) material. According to other embodiments, the inner magnetic layer may be a layer of iron (Fe) material.

According to still other embodiments, the inner magnetic layer may include an iron (Fe) alloy material. According to yet other embodiments, the inner magnetic layer may consist essentially of an iron (Fe) alloy material. According to other embodiments, the inner magnetic layer may be a layer of iron (Fe) alloy material.

According to still other embodiments, the inner magnetic layer may include a nickel (Ni) material. According to yet other embodiments, the inner magnetic layer may consist essentially of a nickel (Ni) material. According to other embodiments, the inner magnetic layer may be a layer of nickel (Ni) material.

According to still other embodiments, the inner magnetic layer may include a nickel (Ni) alloy material. According to yet other embodiments, the inner magnetic layer may consist essentially of a nickel (Ni) alloy material. According to other embodiments, the inner magnetic layer may be a layer of nickel (Ni) alloy material.

According to still other embodiments, the inner magnetic layer may include a permalloy material. According to yet other embodiments, the inner magnetic layer may consist essentially of a permalloy material. According to other embodiments, the inner magnetic layer may be a layer of permalloy material.

According to still other embodiments, the inner magnetic layer may include any combination of a cobalt (Co) material, a cobalt (Co) alloy material, an iron (Fe) material, an iron (Fe) alloy material, a nickel (Ni) material, a nickel (Ni) alloy material, and a permalloy. According to yet other embodiments, the inner magnetic layer may consist essentially of any combination of a cobalt (Co) material, a cobalt (Co) alloy material, an iron (Fe) material, an iron (Fe) alloy material, a nickel (Ni) material, a nickel (Ni) alloy material, and a permalloy. According to other embodiments, the inner magnetic layer may be a layer of any combination of a cobalt (Co) material, a cobalt (Co) alloy material, an iron (Fe) material, an iron (Fe) alloy material, a nickel (Ni) material, a nickel (Ni) alloy material, and a permalloy.

According to yet other embodiments, the inner magnetic layer may have a particular thickness as measured using inductively coupled plasma optical emission spectroscopy. For example, the inner magnetic layer may have a thickness of at least about 0.05 microns, such as, at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns. According to still other embodiments, the inner magnetic layer may have a thickness of not greater than about 3.0 microns, such as, not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns. It will be appreciated that the thickness of the inner magnetic layer may be any value between, and including, any of the minimum and maximum values noted above. It will be further appreciated that the thickness of the inner magnetic layer may be within a range between, and including, any of the minimum and maximum values noted above.

According to yet other embodiments, the inner magnetic layer may have a particular permeability rating (X, Y), where the permeability rating (X, Y) is equal to the peak point (X, Y) along the plot of the imaginary part of magnetic permeability (μ") of the composite plotted as a function of frequency. For example, the inner magnetic layer may have a permeability rating (X, Y) where X is within the range of 10 MHz to 10 GHz and Y is at least about 100, such as, where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800. According to yet other embodiments, the inner magnetic layer may have a permeability rating (X, Y) where X is within the range of 10 MHz to 10 GHz and Y is not greater than about 5000. It will be appreciated that the permeability rating of the inner magnetic layer may be any value between, and including, any of the minimum and maximum values noted above. It will be further appreciated that the permeability rating of the inner magnetic layer may be within a range between, and including, any of the minimum and maximum values noted above.

According to still other embodiments, depositing the inner magnetic layer may include sputter-deposition, atomic layer deposition, electro-plating, evaporation, chemical vapor deposition and their adaptations, or especially in a roll-to-toll machine.

Figure 3:
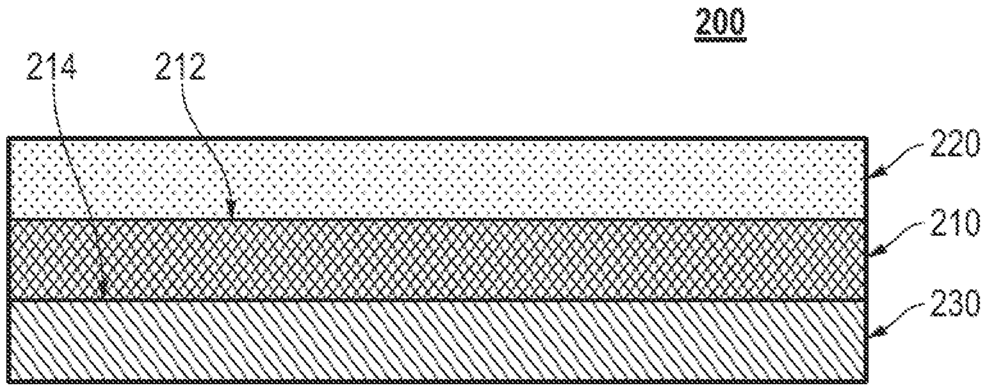
FIG. 3 includes an illustration showing the configuration of a magnetic multilayer composite formed according to embodiments described herein.

Referring now to embodiments of the magnetic multilayer composite formed according to forming method 100, FIG. 3 includes a diagram of a magnetic multilayer composite 300. As shown in FIG. 3, the magnetic multilayer composite 300 may include a core substrate layer 310, an outer magnetic layer 320 overlying a first surface 312 of the core substrate layer 310, and an inner magnetic layer 330 underlying a second surface 314 of the core substrate layer 310, where the second surface 314 is opposite of the first surface 312.

According to still other embodiments, the magnetic multilayer composite 300 may have a particular permeability rating (X, Y), where the permeability rating (X, Y) is equal to the peak point (X, Y) along the plot of the imaginary part of magnetic permeability (μ") of the composite plotted as a function of frequency. For example, the magnetic multilayer composite 300 may have a permeability rating (X, Y) where X is within the range of 10 MHz to 10 GHz and Y is at least about 100, such as, where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800. According to yet other embodiments, the magnetic multilayer composite 300 may have a permeability rating (X, Y) where X is within the range of 10 MHz to 10 GHz and Y is not greater than about 5000. It will be appreciated that the permeability rating of the magnetic multilayer composite 300 may be any value between, and including, any of the minimum and maximum values noted above. It will be further appreciated that the permeability rating of the magnetic multilayer composite 300 may be within a range between, and including, any of the minimum and maximum values noted above.

According to yet other embodiments, the magnetic multilayer composite 300 may have a particular magnetic volume ratio $V_M/V_S$, where $V_M$ is equal to the total volume of magnetic material in the composite and $V_S$ is the total volume of substrate. For example, the magnetic multilayer composite 300 may have a magnetic volume ratio $V_M/V_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic volume ratio $V_M/V_S$ of not greater than about 1.0, such as, not greater than about 0.9 or not greater than about 0.8 or not greater than about 0.7 or not greater than about 0.6 or not greater than about 0.5. It will be appreciated that the magnetic volume ratio $V_M/V_S$ of the magnetic multilayer composite 300 may be any value between, and including, any of the minimum and maximum values noted above. It will be further appreciated that the magnetic volume ratio $V_M/V_S$ of the magnetic multilayer composite 300 may be within a range between, and including, any of the minimum and maximum values noted above.

According to yet other embodiments, the magnetic multilayer composite 300 may have a particular magnetic layer volume ratio $V_{OML}/V_S$, where $V_{OML}$ is equal to the total volume of the outer magnetic layer and $V_S$ is the total volume of the substrate. For example, the magnetic multilayer composite 300 may have a magnetic volume ratio $V_{OML}/V_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic layer volume ratio $V_{OML}/V_S$ of not greater than about 1.0, such as, not greater than about 0.9 or not greater than about 0.8 or not greater than about 0.7 or not greater than about 0.6 or not greater than about 0.5. It will be appreciated that the magnetic layer volume ratio $V_{OML}/V_S$ of the magnetic multilayer composite 300 may be any value between, and including, any of the minimum and maximum values noted above. It will be further appreciated that the magnetic layer volume ratio $V_{OML}/V_S$ of the magnetic multilayer composite 300 may be within a range between, and including, any of the minimum and maximum values noted above.

According to yet other embodiments, the magnetic multilayer composite 300 may have a particular magnetic layer volume ratio $V_{IML}/V_S$, where $V_{IML}$ is equal to the total volume of the inner magnetic layer and $V_S$ is the total volume of the substrate. For example, the magnetic multilayer composite 300 may have a magnetic volume ratio $V_M/V_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic layer volume ratio $V_{IML}/V_S$ of not greater than about 1.0, such as, not greater than about 0.9 or not greater than about 0.8 or not greater than about 0.7 or not greater than about 0.6 or not greater than about 0.5. It will be appreciated that the magnetic layer volume ratio $V_{IML}/V_S$ of the magnetic multilayer composite 300 may be any value between, and including, any of the minimum and maximum values noted above. It will be further appreciated that the magnetic layer volume ratio $V_{IML}/V_S$ of the magnetic multilayer composite 300 may be within a range between, and including, any of the minimum and maximum values noted above.

According to yet other embodiments, the magnetic multilayer composite 300 may have a particular magnetic thickness ratio $T_M/T_S$, where $T_M$ is equal to the total thickness of magnetic material in the composite and $T_S$ is the total thickness of substrate. For example, the magnetic multilayer composite 300 may have a magnetic thickness ratio $T_M/T_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic thickness ratio $T_M/T_S$ of not greater than about 1.0, such as, not greater than about 0.9 or not greater than about 0.8 or not greater than about 0.7 or not greater than about 0.6 or not greater than about 0.5. It will be appreciated that the magnetic thickness ratio $T_M/T_S$ of the magnetic multilayer composite 300 may be any value between, and including, any of the minimum and maximum values noted above. It will be further appreciated that the magnetic thickness ratio $T_M/T_S$ of the magnetic multilayer composite 300 may be within a range between, and including, any of the minimum and maximum values noted above.

According to yet other embodiments, the magnetic multilayer composite 300 may have a particular magnetic layer thickness ratio $T_{OML}/T_S$, where $T_{OML}$ is equal to the total thickness of the outer magnetic layer and $T_S$ is the total thickness of the substrate. For example, the magnetic multilayer composite 300 may have a magnetic thickness ratio $T_{OML}/T_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic layer thickness ratio $T_{OML}/T_S$ of not greater than about 1.0, such as, not greater than about 0.9 or not greater than about 0.8 or not greater than about 0.7 or not greater than about 0.6 or not greater than about 0.5. It will be appreciated that the magnetic layer thickness ratio $T_{OML}/T_S$ of the magnetic multilayer composite 300 may be any value between, and including, any of the minimum and maximum values noted above. It will be further appreciated that the magnetic layer thickness ratio $T_{OML}/T_S$ of the magnetic multilayer composite 300 may be within a range between, and including, any of the minimum and maximum values noted above.

According to yet other embodiments, the magnetic multilayer composite 300 may have a particular magnetic layer thickness ratio $T_{IML}/T_S$, where $T_{IML}$ is equal to the total thickness of the inner magnetic layer and $T_S$ is the total thickness of the substrate. For example, the magnetic multilayer composite 300 may have a magnetic thickness ratio $T_M/T_S$ of at least about 0.005, such as, at least about 0.01 or at least about 0.05 or at least about 0.1 or at least about 0.2 or at least about 0.3 or at least about 0.4 or at least about 0.5. According to still other embodiments, the magnetic multilayer composite 300 may have a magnetic layer thickness ratio $T_{IML}/T_S$ of not greater than about 1.0, such as, not greater than about 0.9 or not greater than about 0.8 or not greater than about 0.7 or not greater than about 0.6 or not greater than about 0.5. It will be appreciated that the magnetic layer thickness ratio $T_{IML}/T_S$ of the magnetic multilayer composite 300 may be any value between, and including, any of the minimum and maximum values noted above. It will be further appreciated that the magnetic layer thickness ratio $T_{IML}/T_S$ of the magnetic multilayer composite 300 may be within a range between, and including, any of the minimum and maximum values noted above.

According to yet other embodiments, the magnetic multilayer composite 300 may have a particular thickness. For example, the magnetic multilayer composite 300 may have a thickness of at least about 3 microns, such as, at least about 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or even at least about 100 microns. According to still other embodiments, the magnetic multilayer composite 300 may have a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns. It will be appreciated that the thickness of the magnetic multilayer composite 300 may be any value between, and including, any of the minimum and maximum values noted above. It will be further appreciated that the thickness of the magnetic multilayer composite 300 may be within a range between, and including, any of the minimum and maximum values noted above.

According to particular embodiments, the core substrate layer 310 may include a plastic material. According to yet other embodiments, the core substrate layer 310 may consist essentially of a plastic material. According to other embodiments, the core substrate layer 310 may be a layer of plastic material.

According to still other embodiments, the core substrate layer 310 may include a polyethylene terephthalate (PET) material. According to yet other embodiments, the core substrate layer 310 may consist essentially of a polyethylene terephthalate (PET) material. According to other embodiments, the core substrate layer 310 may be a layer of polyethylene terephthalate (PET) material.

According to still other embodiments, the core substrate layer 310 may include a polyethylene naphthalate (PEN) material. According to yet other embodiments, the core substrate layer 310 may consist essentially of a polyethylene naphthalate (PEN) material. According to other embodiments, the core substrate layer 310 may be a layer of polyethylene naphthalate (PEN) material.

According to still other embodiments, the core substrate layer 310 may include a polyimide (PI) material. According to yet other embodiments, the core substrate layer 310 may consist essentially of a polyimide (PI) material. According to other embodiments, the core substrate layer 310 may be a layer of polyimide (PI) material.

According to still other embodiments, the core substrate layer 310 may include any combination of a polyethylene terephthalate (PET) material, a polyethylene naphthalate (PEN) material, and a polyimide (PI) material. According to yet other embodiments, the core substrate layer 310 may consist essentially of any combination of a polyethylene terephthalate (PET) material, a polyethylene naphthalate (PEN) material, and a polyimide (PI) material. According to other embodiments, the core substrate layer 310 may be a layer of any combination of a polyethylene terephthalate (PET) material, a polyethylene naphthalate (PEN) material, and a polyimide (PI) material.

According to yet other embodiments, the core substrate layer 310 may have a particular thickness. For example, the core substrate layer 310 may have a thickness of at least about 3 microns, such as, at least about 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or even at least about 100 microns. According to still other embodiments, the core substrate layer 310 may have a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns. It will be appreciated that the thickness of the core substrate layer 310 may be any value between, and including, any of the minimum and maximum values noted above. It will be further appreciated that the thickness of the core substrate layer 310 may be within a range between, and including, any of the minimum and maximum values noted above.

According to particular embodiments, the outer magnetic layer 320 may include a magnetic material. According to other embodiments, the outer magnetic layer 320 may consist essentially of a magnetic material. According to yet other embodiments, the outer magnetic layer 320 may be a layer of magnetic material.

According to yet other embodiments, the outer magnetic layer 320 may include a soft-magnetic material. According to other embodiments, the outer magnetic layer 320 may consist essentially of a soft-magnetic material. According to yet other embodiments, the outer magnetic layer 320 may be a layer of soft-magnetic material.

According to yet other embodiments, the outer magnetic layer 320 may include a ferro-magnetic material. According to other embodiments, the outer magnetic layer 320 may consist essentially of a ferro-magnetic material. According to yet other embodiments, the outer magnetic layer 320 may be a layer of ferro-magnetic material.

According to still other embodiments, the outer magnetic layer 320 may include a cobalt (Co) material. According to yet other embodiments, the outer magnetic layer 320 may consist essentially of a cobalt (Co) material. According to other embodiments, the outer magnetic layer 320 may be a layer of cobalt (Co) material.

According to still other embodiments, the outer magnetic layer 320 may include a cobalt (Co) alloy material. According to yet other embodiments, the outer magnetic layer 320 may consist essentially of a cobalt (Co) alloy material. According to other embodiments, the outer magnetic layer 320 may be a layer of cobalt (Co) alloy material.

According to still other embodiments, the outer magnetic layer 320 may include an iron (Fe) material. According to yet other embodiments, the outer magnetic layer 320 may consist essentially of an iron (Fe) material. According to other embodiments, the outer magnetic layer 320 may be a layer of iron (Fe) material.

According to still other embodiments, the outer magnetic layer 320 may include an iron (Fe) alloy material. According to yet other embodiments, the outer magnetic layer 320 may consist essentially of an iron (Fe) alloy material. According to other embodiments, the outer magnetic layer 320 may be a layer of iron (Fe) alloy material.

According to still other embodiments, the outer magnetic layer 320 may include a nickel (Ni) material. According to yet other embodiments, the outer magnetic layer 320 may consist essentially of a nickel (Ni) material. According to other embodiments, the outer magnetic layer 320 may be a layer of nickel (Ni) material.

According to still other embodiments, the outer magnetic layer 320 may include a nickel (Ni) alloy material. According to yet other embodiments, the outer magnetic layer 320 may consist essentially of a nickel (Ni) alloy material. According to other embodiments, the outer magnetic layer 320 may be a layer of nickel (Ni) alloy material.

According to still other embodiments, the outer magnetic layer 320 may include a permalloy material. According to yet other embodiments, the outer magnetic layer 320 may consist essentially of a permalloy material. According to other embodiments, the outer magnetic layer 320 may be a layer of permalloy material.

According to still other embodiments, the outer magnetic layer 320 may include any combination of a cobalt (Co) material, a cobalt (Co) alloy material, an iron (Fe) material, an iron (Fe) alloy material, a nickel (Ni) material, a nickel (Ni) alloy material, and a permalloy. According to yet other embodiments, the outer magnetic layer 320 may consist essentially of any combination of a cobalt (Co) material, a cobalt (Co) alloy material, an iron (Fe) material, an iron (Fe) alloy material, a nickel (Ni) material, a nickel (Ni) alloy material, and a permalloy. According to other embodiments, the outer magnetic layer 320 may be a layer of any combination of a cobalt (Co) material, a cobalt (Co) alloy material, an iron (Fe) material, an iron (Fe) alloy material, a nickel (Ni) material, a nickel (Ni) alloy material, and a permalloy.

According to yet other embodiments, the outer magnetic layer 320 may have a particular thickness as measured using inductively coupled plasma optical emission spectroscopy. For example, the outer magnetic layer 320 may have a thickness of at least about 3 microns, such as, at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns. According to still other embodiments, the outer magnetic layer 320 may have a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns. It will be appreciated that the thickness of the outer magnetic layer 320 may be any value between, and including, any of the minimum and maximum values noted above. It will be further appreciated that the thickness of the outer magnetic layer 320 may be within a range between, and including, any of the minimum and maximum values noted above.

According to yet other embodiments, the outer magnetic layer 320 may have a particular permeability rating (X, Y), where the permeability rating (X, Y) is equal to the peak point (X, Y) along the plot of the imaginary part of magnetic permeability (μ") of the composite plotted as a function of frequency. For example, the outer magnetic layer 320 may have a permeability rating (X, Y) where X is within the range of 10 MHz to 10 GHz and Y is at least about 100, such as, where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800. According to yet other embodiments, the outer magnetic layer 320 may have a permeability rating (X, Y) where X is within the range of 10 MHz to 10 GHz and Y is not greater than about 5000. It will be appreciated that the permeability rating of the outer magnetic layer 320 may be any value between, and including, any of the minimum and maximum values noted above. It will be further appreciated that the permeability rating of the outer magnetic layer 320 may be within a range between, and including, any of the minimum and maximum values noted above.

According to particular embodiments, the inner magnetic layer 330 may include a magnetic material. According to other embodiments, the inner magnetic layer 330 may consist essentially of a magnetic material. According to yet other embodiments, the inner magnetic layer 330 may be a layer of magnetic material.

According to yet other embodiments, the inner magnetic layer 330 may include a soft-magnetic material. According to other embodiments, the inner magnetic layer 330 may consist essentially of a soft-magnetic material. According to yet other embodiments, the inner magnetic layer 330 may be a layer of soft-magnetic material.

According to yet other embodiments, the inner magnetic layer 330 may include a ferro-magnetic material. According to other embodiments, the inner magnetic layer 330 may consist essentially of a ferro-magnetic material. According to yet other embodiments, the inner magnetic layer 330 may be a layer of ferro-magnetic material.

According to still other embodiments, the inner magnetic layer 330 may include a cobalt (Co) material. According to yet other embodiments, the inner magnetic layer 330 may consist essentially of a cobalt (Co) material. According to other embodiments, the inner magnetic layer 330 may be a layer of cobalt (Co) material.

According to still other embodiments, the inner magnetic layer 330 may include a cobalt (Co) alloy material. According to yet other embodiments, the inner magnetic layer 330 may consist essentially of a cobalt (Co) alloy material. According to other embodiments, the inner magnetic layer 330 may be a layer of cobalt (Co) alloy material.

According to still other embodiments, the inner magnetic layer 330 may include an iron (Fe) material. According to yet other embodiments, the inner magnetic layer 330 may consist essentially of an iron (Fe) material. According to other embodiments, the inner magnetic layer 330 may be a layer of iron (Fe) material.

According to still other embodiments, the inner magnetic layer 330 may include an iron (Fe) alloy material. According to yet other embodiments, the inner magnetic layer 330 may consist essentially of an iron (Fe) alloy material. According to other embodiments, the inner magnetic layer 330 may be a layer of iron (Fe) alloy material.

According to still other embodiments, the inner magnetic layer 330 may include a nickel (Ni) material. According to yet other embodiments, the inner magnetic layer 330 may consist essentially of a nickel (Ni) material. According to other embodiments, the inner magnetic layer 330 may be a layer of nickel (Ni) material.

According to still other embodiments, the inner magnetic layer 330 may include a nickel (Ni) alloy material. According to yet other embodiments, the inner magnetic layer 330 may consist essentially of a nickel (Ni) alloy material. According to other embodiments, the inner magnetic layer 330 may be a layer of nickel (Ni) alloy material.

According to still other embodiments, the inner magnetic layer 330 may include a permalloy material. According to yet other embodiments, the inner magnetic layer 330 may consist essentially of a permalloy material. According to other embodiments, the inner magnetic layer 330 may be a layer of permalloy material.

According to still other embodiments, the inner magnetic layer 330 may include any combination of a cobalt (Co) material, a cobalt (Co) alloy material, an iron (Fe) material, an iron (Fe) alloy material, a nickel (Ni) material, a nickel (Ni) alloy material, and a permalloy. According to yet other embodiments, the inner magnetic layer 330 may consist essentially of any combination of a cobalt (Co) material, a cobalt (Co) alloy material, an iron (Fe) material, an iron (Fe) alloy material, a nickel (Ni) material, a nickel (Ni) alloy material, and a permalloy. According to other embodiments, the inner magnetic layer 330 may be a layer of any combination of a cobalt (Co) material, a cobalt (Co) alloy material, an iron (Fe) material, an iron (Fe) alloy material, a nickel (Ni) material, a nickel (Ni) alloy material, and a permalloy.

According to yet other embodiments, the inner magnetic layer 330 may have a particular thickness as measured using inductively coupled plasma optical emission spectroscopy. For example, the inner magnetic layer 330 may have a thickness of at least about 0.05 microns, such as, at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns. According to still other embodiments, the inner magnetic layer 330 may have a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns. It will be appreciated that the thickness of the inner magnetic layer 330 may be any value between, and including, any of the minimum and maximum values noted above. It will be further appreciated that the thickness of the inner magnetic layer 330 may be within a range between, and including, any of the minimum and maximum values noted above.

According to yet other embodiments, the inner magnetic layer 330 may have a particular permeability rating (X, Y), where the permeability rating (X, Y) is equal to the peak point (X, Y) along the plot of the imaginary part of magnetic permeability (μ") of the composite plotted as a function of frequency. For example, the inner magnetic layer 330 may have a permeability rating (X, Y) where X is within the range of 10 MHz to 10 GHz and Y is at least about 100, such as, where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800. According to yet other embodiments, the inner magnetic layer 330 may have a permeability rating (X, Y) where X is within the range of 10 MHz to 10 GHz and Y is not greater than about 5000. It will be appreciated that the permeability rating of the inner magnetic layer 330 may be any value between, and including, any of the minimum and maximum values noted above. It will be further appreciated that the permeability rating of the inner magnetic layer 330 may be within a range between, and including, any of the minimum and maximum values noted above.

According to still other embodiments described herein, the magnetic multilayer composite described herein may be used to form an antenna. According to still other embodiments, an antenna may include a magnetic multilayer composite as described herein. It will be appreciated that the magnetic multilayer composite included in an antenna of embodiments described herein may have any of the characteristics described herein. It will be further appreciated the magnetic multilayer composite included in an antenna of embodiments described herein may for formed according to any of the steps described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A magnetic multilayer composite comprising: a core substrate layer, an outer magnetic layer overlying a first surface of the core substrate layer, and an inner magnetic layer underlying a second surface of the core substrate layer opposite of the first surface of the core substrate layer, wherein the composite comprises a magnetic volume ratio $V_M/V_S$ of at least about 0.005, where $V_M$ is equal to the total volume of magnetic material in the composite and $V_S$ is the total volume of substrate, and wherein the composite comprises a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

Embodiment 2. A magnetic multilayer composite comprising: a core substrate layer, an outer magnetic layer overlying a first surface of the core substrate layer, and an inner magnetic layer underlying a second surface of the core substrate layer opposite of the first surface of the core substrate layer, wherein the composite comprises a magnetic layer thickness ratio $T_M/T_S$ of at least about 0.005, where $T_M$ is equal to the total thickness of the outer magnetic layer and the inner magnetic layer and $T_S$ is the total thickness of the substrate, and wherein the composite comprises a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

Embodiment 3. The magnetic multilayer composite of any one of embodiments 1 and 2, wherein the composite comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 4. The magnetic multilayer composite of any one of embodiments 1 and 2, wherein the composite comprises a permeability rating (X, Y) where X is within the range of 10 MHz to 10 GHz and Y is not greater than about 5000.

Embodiment 5. The magnetic multilayer composite of any one of embodiments 1 and 2, wherein the composite comprises a magnetic layer volume ratio $V_M/V_S$ of at least about 0.005, where $V_M$ is equal to the total volume of magnetic material in the composite and $V_S$ is the total volume of substrate, at least about 0.01 or at least about 0.05 or at least about 0.1 or at least about 0.2 or at least about 0.3 or at least about 0.4 or at least about 0.5, where $V_M$ is equal to the total volume of the outer magnetic layer and the inner magnetic layer and $V_S$ is the total volume of the substrate.

Embodiment 6. The magnetic multilayer composite of any one of embodiments 1 and 2, wherein the composite comprises a magnetic layer volume ratio $V_M/V_S$ of not greater than about 1.0, where $V_M$ is equal to the total volume of magnetic material in the composite and $V_S$ is the total volume of substrate, not greater than about 0.9 or not greater than about 0.8 or not greater than about 0.7 or not greater than about 0.6 or not greater than about 0.5.

Embodiment 7. The magnetic multilayer composite of any one of embodiments 1 and 2, wherein the composite comprises a magnetic layer volume ratio $V_{OML}/V_S$ of at least about 0.0025, where $V_{OML}$ is equal to the total volume of the outer magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 8. The magnetic multilayer composite of any one of embodiments 1 and 2, wherein the composite comprises a magnetic layer volume ratio $V_{OML}/V_S$ of not greater than about 0.5, where $V_{OML}$ is equal to the total volume of the outer magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 9. The magnetic multilayer composite of any one of embodiments 1 and 2, wherein the composite comprises a magnetic layer volume ratio $V_{IML}/V_S$ of at least about 0.0025, where $V_{IML}$ is equal to the total volume of the inner magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 10. The magnetic multilayer composite of any one of embodiments 1 and 2, wherein the composite comprises a magnetic layer volume ratio $V_{IML}/V_S$ of not greater than about 0.5, where $V_{IML}$ is equal to the total volume of the inner magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 11. The magnetic multilayer composite of any one of embodiments 1 and 2, wherein the composite comprises a magnetic layer thickness ratio $T_M/T_S$ of at least about 0.0025, where $T_M$ is equal to the total thickness of the outer magnetic layer and the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 12. The magnetic multilayer composite of any one of embodiments 1 and 2, wherein the composite comprises a magnetic layer thickness ratio $T_M/T_S$ of not greater than about 0.5, where $T_M$ is equal to the total thickness of the outer magnetic layer and the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 13. The magnetic multilayer composite of any one of embodiments 1 and 2, wherein the composite comprises a magnetic layer thickness ratio $T_{OML}/T_S$ of at least about 0.0025, where $T_{OML}$ is equal to the total thickness of the outer magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 14. The magnetic multilayer composite of any one of embodiments 1 and 2, wherein the composite comprises a magnetic layer thickness ratio $T_{OML}/T_S$ of not greater than about 0.5, where $T_{OML}$ is equal to the total thickness of the outer magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 15. The magnetic multilayer composite of any one of embodiments 1 and 2, wherein the composite comprises a magnetic layer thickness ratio $T_{IML}/T_S$ of at least about 0.0025, where $T_{IML}$ is equal to the total thickness of the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 16. The magnetic multilayer composite of any one of embodiments 1 and 2, wherein the composite comprises a magnetic layer thickness ratio $T_{IML}/T_S$ of not greater than about 0.5, where $T_{IML}$ is equal to the total thickness of the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 17. The magnetic multilayer composite of any one of embodiments 1 and 2, wherein the composite comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 18. The magnetic multilayer composite of any one of embodiments 1 and 2, wherein the composite comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 19. The magnetic multilayer composite of any one of embodiments 1 and 2, wherein the core substrate layer comprises a plastic material.

Embodiment 20. The magnetic multilayer composite of any one of embodiments 1 and 2, wherein the core substrate layer comprises PET, PEN, PI, or combinations thereof.

Embodiment 21. The magnetic multilayer composite of any one of embodiments 1 and 2, wherein the core substrate layer comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 22. The magnetic multilayer composite of any one of embodiments 1 and 2, wherein the core substrate layer comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 23. The magnetic multilayer composite of any one of embodiments 1 and 2, wherein the outer magnetic layer comprises a magnetic material.

Embodiment 24. The magnetic multilayer composite of any one of embodiments 1 and 2, wherein the outer magnetic layer comprises a soft-magnetic material, a ferro-magnetic material, or any combination thereof.

Embodiment 25. The magnetic multilayer composite of any one of embodiments 1 and 2, wherein the outer magnetic layer comprises a Co material, a Co alloy material, an Fe material, an Fe alloy material, a Ni material, a Ni alloy material, a permalloy or combinations thereof.

Embodiment 26. The magnetic multilayer composite of any one of embodiments 1 and 2, wherein the outer magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 27. The magnetic multilayer composite of any one of embodiments 1 and 2, wherein the outer magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 28. The magnetic multilayer composite of any one of embodiments 1 and 2, wherein the outer magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 29. The magnetic multilayer composite of any one of embodiments 1 and 2, wherein the outer magnetic layer comprises a permeability rating (X, Y) where X is within the range of 10 MHz to 10 GHz and Y is not greater than about 5000.

Embodiment 30. The magnetic multilayer composite of any one of embodiments 1 and 2, wherein the inner magnetic layer comprises a soft-magnetic material, a ferro-magnetic material, or any combination thereof.

Embodiment 31. The magnetic multilayer composite of any one of embodiments 1 and 2, wherein the inner magnetic layer comprises a Co material, a Co alloy material, an Fe material, an Fe alloy material, a Ni material, a Ni alloy material, a permalloy, or combinations thereof.

Embodiment 32. The magnetic multilayer composite of any one of embodiments 1 and 2, wherein the inner magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 33. The magnetic multilayer composite of any one of embodiments 1 and 2, wherein the inner magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 34. The magnetic multilayer composite of any one of embodiments 1 and 2, wherein the inner magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 35. The magnetic multilayer composite of any one of embodiments 1 and 2, wherein the inner magnetic layer comprises a permeability rating (X, Y) where X is within the range of 10 MHz to 10 GHz and Y is not greater than about 5000.

Embodiment 36. The magnetic multilayer composite of any one of embodiments 1 and 2, wherein the magnetic multilayer composite is configured for use as in an antenna.

Embodiment 37. An antenna comprising a magnetic multilayer composite, wherein the magnetic multilayer composite comprises: a core substrate layer, an outer magnetic layer overlying a first surface of the core substrate layer, and an inner magnetic layer underlying a second surface of the core substrate layer opposite of the first surface of the core substrate layer, wherein the composite comprises a magnetic volume ratio $V_M/V_S$ of at least about 0.005, where $V_M$ is equal to the total volume of magnetic material in the composite and $V_S$ is the total volume of substrate, and wherein the composite comprises a permeability rating (X, Y), where the permeability rating (X, Y) is equal to a peak point (X, Y) along a plot of the imaginary part of magnetic permeability ($\mu''$) of the composite plotted as a function of frequency, where X is within the range of 10 MHz to 10 GHz, and Y is greater than 100.

Embodiment 38. An antenna comprising a magnetic multilayer composite, wherein the magnetic multilayer composite comprises: a core substrate layer, an outer magnetic layer overlying a first surface of the core substrate layer, and an inner magnetic layer underlying a second surface of the core substrate layer opposite of the first surface of the core substrate layer, wherein the composite comprises a magnetic layer thickness ratio $T_M/T_S$ of at least about 0.005, where $T_M$ is equal to the total thickness of the outer magnetic layer and the inner magnetic layer and $T_S$ is the total thickness of the substrate, and wherein the composite comprises a permeability rating (X, Y), where the permeability rating (X, Y) is equal to a peak point (X, Y) along a plot of the imaginary part of magnetic permeability ($\mu''$) of the composite plotted as a function of frequency, where X is within the range of 10 MHz to 10 GHz, and Y is greater than 100.

Embodiment 39. The antenna of any one of embodiments 37 and 38, wherein the composite comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 40. The antenna of any one of embodiments 37 and 38, wherein the composite comprises a permeability rating (X, Y) where X is within the range of 10 MHz to 10 GHz and Y is not greater than about 5000.

Embodiment 41. The antenna of any one of embodiments 37 and 38, wherein the composite comprises a magnetic layer volume ratio $V_M/V_S$ of at least about 0.005, where $V_M$ is equal to the total volume of magnetic material in the composite and $V_S$ is the total volume of substrate, at least about 0.01 or at least about 0.05 or at least about 0.1 or at least about 0.2 or at least about 0.3 or at least about 0.4 or at least about 0.5, where $V_M$ is equal to the total volume of the outer magnetic layer and the inner magnetic layer and $V_S$ is the total volume of the substrate.

Embodiment 42. The antenna of any one of embodiments 37 and 38, wherein the composite comprises a magnetic layer volume ratio $V_M/V_S$ of not greater than about 1.0, where $V_M$ is equal to the total volume of magnetic material in the composite and $V_S$ is the total volume of substrate, not greater than about 0.9 or not greater than about 0.8 or not greater than about 0.7 or not greater than about 0.6 or not greater than about 0.5.

Embodiment 43. The antenna of any one of embodiments 37 and 38, wherein the composite comprises a magnetic layer volume ratio $V_{OML}/V_S$ of at least about 0.0025, where $V_{OML}$ is equal to the total volume of the outer magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 44. The antenna of any one of embodiments 37 and 38, wherein the composite comprises a magnetic layer volume ratio $V_{OML}/V_S$ of not greater than about 0.5, where $V_{OML}$ is equal to the total volume of the outer magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 45. The antenna of any one of embodiments 37 and 38, wherein the composite comprises a magnetic layer volume ratio $V_{IML}/V_S$ of at least about 0.0025, where $V_{IML}$ is equal to the total volume of the inner magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 46. The antenna of any one of embodiments 37 and 38, wherein the composite comprises a magnetic layer volume ratio $V_{IML}/V_S$ of not greater than about 0.5, where $V_{IML}$ is equal to the total volume of the inner magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 47. The antenna of any one of embodiments 37 and 38, wherein the composite comprises a magnetic layer thickness ratio $T_M/T_S$ of at least about 0.0025, where $T_M$ is equal to the total thickness of the outer magnetic layer and the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 48. The antenna of any one of embodiments 37 and 38, wherein the composite comprises a magnetic layer thickness ratio $T_M/T_S$ of not greater than about 0.5, where $T_M$ is equal to the total thickness of the outer magnetic layer and the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 49. The antenna of any one of embodiments 37 and 38, wherein the composite comprises a magnetic layer thickness ratio $T_{OML}/T_S$ of at least about 0.0025, where $T_{OML}$ is equal to the total thickness of the outer magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 50. The antenna of any one of embodiments 37 and 38, wherein the composite comprises a magnetic layer thickness ratio $T_{OML}/T_S$ of not greater than about 0.5, where $T_{OML}$ is equal to the total thickness of the outer magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 51. The antenna of any one of embodiments 37 and 38, wherein the composite comprises a magnetic layer thickness ratio $T_{IML}/T_S$ of at least about 0.0025, where $T_{IML}$ is equal to the total thickness of the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 52. The antenna of any one of embodiments 37 and 38, wherein the composite comprises a magnetic layer thickness ratio $T_{IML}/T_S$ of not greater than about 0.5, where $T_{IML}$ is equal to the total thickness of the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 53. The antenna of any one of embodiments 37 and 38, wherein the composite comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 54. The antenna of any one of embodiments 37 and 38, wherein the composite comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 55. The antenna of any one of embodiments 37 and 38, wherein the core substrate layer comprises a plastic material.

Embodiment 56. The antenna of any one of embodiments 37 and 38, wherein the core substrate layer comprises PET, PEN, PI or combinations thereof.

Embodiment 57. The antenna of any one of embodiments 37 and 38, wherein the core substrate layer comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 58. The antenna of any one of embodiments 37 and 38, wherein the core substrate layer comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 59. The antenna of any one of embodiments 37 and 38, wherein the outer magnetic layer comprises a magnetic material.

Embodiment 60. The antenna of any one of embodiments 37 and 38, wherein the outer magnetic layer comprises a soft-magnetic material, a ferro-magnetic material, or any combination thereof.

Embodiment 61. The antenna of any one of embodiments 37 and 38, wherein the outer magnetic layer comprises a Co material, a Co alloy material, an Fe material, an Fe alloy material, a Ni material, a Ni alloy material, a permalloy, or combinations thereof.

Embodiment 62. The antenna of any one of embodiments 37 and 38, wherein the outer magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 63. The antenna of any one of embodiments 37 and 38, wherein the outer magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 64. The antenna of any one of embodiments 37 and 38, wherein the outer magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 65. The antenna of any one of embodiments 37 and 38, wherein the outer magnetic layer comprises a permeability rating (X, Y) where X is within the range of 10 MHz to 10 GHz and Y is not greater than about 5000.

Embodiment 66. The antenna of any one of embodiments 37 and 38, wherein the inner magnetic layer comprises a soft-magnetic material, a ferro-magnetic material, or any combination thereof.

Embodiment 67. The antenna of any one of embodiments 37 and 38, wherein the inner magnetic layer comprises a Co material, a Co alloy material, an Fe material, an Fe alloy material, a Ni material, a Ni alloy material, a permalloy, or combinations thereof.

Embodiment 68. The antenna of any one of embodiments 37 and 38, wherein the inner magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 69. The antenna of any one of embodiments 37 and 38, wherein the inner magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 70. The antenna of any one of embodiments 37 and 38, wherein the inner magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 71. The antenna of any one of embodiments 37 and 38, wherein the inner magnetic layer comprises a permeability rating (X, Y) where X is within the range of 10 MHz to 10 GHz and Y is not greater than about 5000.

Embodiment 72. A method of forming a magnetic multilayer composite comprising: providing a core substrate layer, depositing an outer magnetic layer overlying a first surface of the core substrate layer, and depositing an inner magnetic layer underlying a second surface of the core substrate layer opposite of the first surface of the core substrate layer, wherein the composite comprises a magnetic volume ratio $V_M/V_S$ of at least about 0.005, where $V_M$ is equal to the total volume of magnetic material in the composite and $V_S$ is the total volume of substrate, and wherein the composite comprises a permeability rating (X, Y), where the permeability rating (X, Y) is equal to a peak point (X, Y) along a plot of the imaginary part of magnetic permeability ($\mu''$) of the composite plotted as a function of frequency, where X is within the range of 10 MHz to 10 GHz, and Y is greater than 100.

Embodiment 73. A method of forming a magnetic multilayer composite comprising: providing a core substrate layer, depositing an outer magnetic layer overlying a first surface of the core substrate layer, and depositing an inner magnetic layer underlying a second surface of the core substrate layer opposite of the first surface of the core substrate layer, wherein the composite comprises a magnetic layer thickness ratio $T_M/T_S$ of at least about 0.005, where $T_M$ is equal to the total thickness of the outer magnetic layer and the inner magnetic layer and $T_S$ is the total thickness of the substrate, and wherein the composite comprises a permeability rating (X, Y), where the permeability rating (X, Y) is equal to a peak point (X, Y) along a plot of the imaginary part of magnetic permeability ($\mu''$) of the composite plotted as a function of frequency, where X is within the range of 10 MHz to 10 GHz, and Y is greater than 100.

Embodiment 74. The method of any one of embodiments 72 and 73, wherein depositing the outer magnetic layer comprises sputter-deposition, atomic layer deposition, electro-plating, evaporation, chemical vapor deposition and their adaptations, or especially in roll-to-toll machine.

Embodiment 75. The method of any one of embodiments 72 and 73, wherein depositing the inner magnetic layer comprises sputter-deposition, atomic layer deposition, electro-plating, evaporation, chemical vapor deposition and their adaptations, or especially in roll-to-toll machine.

Embodiment 76. The method of any one of embodiments 72 and 73, wherein the composite comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 77. The method of any one of embodiments 72 and 73, wherein the composite comprises a permeability rating (X, Y) where X is within the range of 10 MHz to 10 GHz and Y is not greater than about 5000.

Embodiment 78. The method of any one of embodiments 72 and 73, wherein the composite comprises a magnetic layer volume ratio $V_M/V_S$ of at least about 0.005, where $V_M$ is equal to the total volume of magnetic material in the composite and $V_S$ is the total volume of substrate, at least about 0.01 or at least about 0.05 or at least about 0.1 or at least about 0.2 or at least about 0.3 or at least about 0.4 or at least about 0.5, where $V_M$ is equal to the total volume of the outer magnetic layer and the inner magnetic layer and $V_S$ is the total volume of the substrate.

Embodiment 79. The method of any one of embodiments 72 and 73, wherein the composite comprises a magnetic layer volume ratio $V_M/V_S$ of not greater than about 1.0, where $V_M$ is equal to the total volume of magnetic material in the composite and $V_S$ is the total volume of substrate, not greater than about 0.9 or not greater than about 0.8 or not greater than about 0.7 or not greater than about 0.6 or not greater than about 0.5.

Embodiment 80. The method of any one of embodiments 72 and 73, wherein the composite comprises a magnetic layer volume ratio $V_{OML}/V_S$ of at least about 0.0025, where $V_{OML}$ is equal to the total volume of the outer magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 81. The method of any one of embodiments 72 and 73, wherein the composite comprises a magnetic layer volume ratio $V_{OML}/V_S$ of not greater than about 0.5, where $V_{OML}$ is equal to the total volume of the outer magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 82. The method of any one of embodiments 72 and 73, wherein the composite comprises a magnetic layer volume ratio $V_{IML}/V_S$ of at least about 0.0025, where $V_{IML}$ is equal to the total volume of the inner magnetic layer and $V_S$ is the total volume of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 83. The method of any one of embodiments 72 and 73, wherein the composite comprises a magnetic layer volume ratio $V_{IML}/V_S$ of not greater than about 0.5, where $V_{IML}$ is equal to the total volume of the inner magnetic layer and $V_S$ is the total volume of the substrate, not greater than about 0.45 or not greater than about 0.40 or not greater than about 0.35 or not greater than about 0.30 or not greater than about 0.25 or not greater than about 0.20 or not greater than about 0.15.

Embodiment 84. The method of any one of embodiments 72 and 73, wherein the composite comprises a magnetic layer thickness ratio $T_M/T_S$ of at least about 0.0025, where $T_M$ is equal to the total thickness of the outer magnetic layer and the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 85. The method of any one of embodiments 72 and 73, wherein the composite comprises a magnetic layer thickness ratio $T_M/T_S$ of not greater than about 0.5, where $T_M$ is equal to the total thickness of the outer magnetic layer and the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 86. The method of any one of embodiments 72 and 73, wherein the composite comprises a magnetic layer thickness ratio $T_{OML}/T_S$ of at least about 0.0025, where $T_{OML}$ is equal to the total thickness of the outer magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 87. The method of any one of embodiments 72 and 73, wherein the composite comprises a magnetic layer thickness ratio $T_{OML}/T_S$ of not greater than about 0.5, where $T_{OML}$ is equal to the total thickness of the outer magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 88. The method of any one of embodiments 72 and 73, wherein the composite comprises a magnetic layer thickness ratio $T_{IML}/T_S$ of at least about 0.0025, where $T_{IML}$ is equal to the total thickness of the inner magnetic layer and $T_S$ is the total thickness of the substrate, at least about 0.005 or at least about 0.0075 or at least about 0.01 or at least about 0.02 or at least about 0.03 or at least about 0.04 or at least about 0.05 or at least about 0.06 or at least about 0.07 or at least about 0.08 or at least about 0.09 or at least about 0.1.

Embodiment 89. The method of any one of embodiments 72 and 73, wherein the composite comprises a magnetic layer thickness ratio $T_{IML}/T_S$ of not greater than about 0.5, where $T_{IML}$ is equal to the total thickness of the inner magnetic layer and $T_S$ is the total thickness of the substrate, not greater than about 0.45 or not greater than about 0.40 or not greater than about 0.35 or not greater than about 0.30 or not greater than about 0.25 or not greater than about 0.20 or not greater than about 0.15.

Embodiment 90. The method of any one of embodiments 72 and 73, wherein the composite comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 91. The method of any one of embodiments 72 and 73, wherein the composite comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 92. The method of any one of embodiments 72 and 73, wherein the core substrate layer comprises a plastic material.

Embodiment 93. The method of any one of embodiments 72 and 73, wherein the core substrate layer comprises PET, PEN, PI, or combinations thereof.

Embodiment 94. The method of any one of embodiments 72 and 73, wherein the core substrate layer comprises a thickness of at least about 3 microns or 5 microns or at least about 10 microns or at least about 15 microns or at least about 20 microns or at least about 25 microns or at least about 30 microns or at least about 35 microns or at least about 40 microns or at least about 50 microns or at least about 60 microns or at least about 70 microns or at least about 80 microns or at least about 90 microns or at least about 100 microns.

Embodiment 95. The method of any one of embodiments 72 and 73, wherein the core substrate layer comprises a thickness of not greater than about 250 microns or not greater than about 240 microns or not greater than about 230 microns or not greater than about 220 microns or not greater than about 210 microns or not greater than about 200 microns or not greater than about 190 microns or not greater than about 180 microns or not greater than about 170 microns or not greater than about 160 microns or not greater than about 150 microns.

Embodiment 96. The method of any one of embodiments 72 and 73, wherein the outer magnetic layer comprises a magnetic material.

Embodiment 97. The method of any one of embodiments 72 and 73, wherein the outer magnetic layer comprises a soft-magnetic material, a ferro-magnetic material, or any combination thereof.

Embodiment 98. The method of any one of embodiments 72 and 73, wherein the outer magnetic layer comprises a Co material, a Co alloy material, an Fe material, an Fe alloy material, a Ni material, a Ni alloy material, a permalloy, or combinations thereof.

Embodiment 99. The method of any one of embodiments 72 and 73, wherein the outer magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 100. The method of any one of embodiments 72 and 73, wherein the outer magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 101. The method of any one of embodiments 72 and 73, wherein the outer magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 102. The method of any one of embodiments 72 and 73, wherein the outer magnetic layer comprises a permeability rating (X, Y) where X is within the range of 10 MHz to 10 GHz and Y is not greater than about 5000.

Embodiment 103. The method of any one of embodiments 72 and 73, wherein the inner magnetic layer comprises a soft-magnetic material, a ferro-magnetic material, or any combination thereof.

Embodiment 104. The method of any one of embodiments 72 and 73, wherein the inner magnetic layer comprises a Co material, a Co alloy material, an Fe material, an Fe alloy material, a Ni material, a Ni alloy material, a permalloy, or combinations thereof.

Embodiment 105. The method of any one of embodiments 72 and 73, wherein the inner magnetic layer comprises a thickness of at least about 0.05 microns or at least about 0.06 microns or at least about 0.07 microns or at least about 0.08 microns or at least about 0.09 microns or at least about 0.1 microns or at least about 0.2 microns or at least about 0.3 microns or at least about 0.4 microns or at least about 0.5 microns or at least about 0.6 microns or at least about 0.7 microns or at least about 0.8 microns or at least about 0.9 microns or even at least about 1.0 microns.

Embodiment 106. The method of any one of embodiments 72 and 73, wherein the inner magnetic layer comprises a thickness of not greater than about 3.0 microns or not greater than about 2.9 microns or not greater than about 2.8 microns or not greater than about 2.7 microns or not greater than about 2.6 microns or not greater than about 2.5 microns or not greater than about 2.4 microns or not greater than about 2.3 microns or not greater than about 2.2 microns or not greater than about 2.1 microns or not greater than about 2.0 microns.

Embodiment 107. The method of any one of embodiments 72 and 73, wherein the inner magnetic layer comprises a permeability rating (X, Y) where X is within the range of 10 MHz to 10 GHz and Y is at least about 100 or where X is within the range of 10 MHz to 10 GHz and Y is at least about 120 or where X is within the range of 10 MHz to 10 GHz and Y is at least about 140 or where X is within the range of 10 MHz to 10 GHz and Y is at least about 150 or where X is within the range of 10 MHz to 10 GHz and Y is at least about 160 or where X is within the range of 10 MHz to 10 GHz and Y is at least about 170 or where X is within the range of 10 MHz to 10 GHz and Y is at least about 180 or where X is within the range of 10 MHz to 10 GHz and Y is at least about 190 or where X is within the range of 10 MHz to 10 GHz and Y is at least about 200 or where X is within the range of 10 MHz to 10 GHz and Y is at least about 250 or where X is within the range of 10 MHz to 10 GHz and Y is at least about 300 or where X is within the range of 10 MHz to 10 GHz and Y is at least about 350 or where X is within the range of 10 MHz to 10 GHz and Y is at least about 400 or where X is within the range of 10 MHz to 10 GHz and Y is at least about 450 or where X is within the range of 10 MHz to 10 GHz and Y is at least about 500 or where X is within the range of 10 MHz to 10 GHz and Y is at least about 550 or where X is within the range of 10 MHz to 10 GHz and Y is at least about 600 or where X is within the range of 10 MHz to 10 GHz and Y is at least about 650 or where X is within the range of 10 MHz to 10 GHz and Y is at least about 700 or where X is within the range of 10 MHz to 10 GHz and Y is at least about 750 or even where X is within the range of 10 MHz to 10 GHz and Y is at least about 800.

Embodiment 108. The method of any one of embodiments 72 and 73, wherein the inner magnetic layer comprises a permeability rating (X, Y) where X is within the range of 10 MHz to 10 GHz and Y is not greater than about 5000.

Note that not all of the activities described above in the general description or the examples are required, that a portion of a specific activity may not be required, and that one or more further activities may be performed in addition to those described. Still further, the order in which activities are listed is not necessarily the order in which they are performed.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A magnetic multilayer composite comprising:

a core substrate layer, an outer magnetic layer overlying a first surface of the core substrate layer, and an inner magnetic layer underlying a second surface of the core substrate layer opposite of the first surface of the core substrate layer, wherein the composite comprises a magnetic volume ratio $V_M/V_S$ of at least about 0.005, where $V_M$ is equal to the total volume of magnetic material in the composite and $V_S$ is the total volume of substrate, and wherein the composite comprises a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

2. The magnetic multilayer composite of claim 1, wherein the composite comprises a permeability rating (X, Y) where X is within the range of 10 MHz to 10 GHz and Y is at least about 100.

3. The magnetic multilayer composite of claim 1, wherein the composite comprises a permeability rating (X, Y) where X is within the range of 10 MHz to 10 GHz and Y is not greater than about 5000.

4. The magnetic multilayer composite of claim 1, wherein the composite comprises a magnetic layer volume ratio $V_M/V_S$ of at least about 0.005 and not greater than about 1.0, where $V_M$ is equal to the total volume of magnetic material in the composite and $V_S$ is the total volume of substrate.

5. The magnetic multilayer composite of claim 1, wherein the composite comprises a thickness of at least about 3 microns and not greater than about 250 microns.

6. The magnetic multilayer composite of claim 1, wherein the core substrate layer comprises a plastic material.

7. The magnetic multilayer composite of claim 1, wherein the core substrate layer comprises PET, PEN, PI, or combinations thereof.

8. The magnetic multilayer composite of claim 1, wherein the core substrate layer comprises a thickness of at least about 3 microns and not greater than about 250 microns.

9. The magnetic multilayer composite of claim 1, wherein the outer magnetic layer comprises a soft-magnetic material, a ferro-magnetic material, or any combination thereof.

10. The magnetic multilayer composite of claim 1, wherein the outer magnetic layer comprises a Co material, a Co alloy material, an Fe material, an Fe alloy material, a Ni material, a Ni alloy material, a permalloy or combinations thereof.

11. The magnetic multilayer composite of claim 1, wherein the outer magnetic layer comprises a thickness of at least about 0.05 microns and not greater than about 3.0 microns.

12. The magnetic multilayer composite of claim 1, wherein the outer magnetic layer comprises a permeability rating (X, Y) where X is within the range of 10 MHz to 10 GHz and Y is at least about 100.

13. The magnetic multilayer composite of claim 1, wherein the outer magnetic layer comprises a permeability rating (X, Y) where X is within the range of 10 MHz to 10 GHz and Y is not greater than about 5000.

14. The magnetic multilayer composite of claim 1, wherein the inner magnetic layer comprises a soft-magnetic material, a ferro-magnetic material, or any combination thereof.

15. The magnetic multilayer composite of claim 1, wherein the inner magnetic layer comprises a Co material, a Co alloy material, an Fe material, an Fe alloy material, a Ni material, a Ni alloy material, a permalloy, or combinations thereof.

16. The magnetic multilayer composite of claim 1, wherein the inner magnetic layer comprises a thickness of at least about 0.05 microns and not greater than about 3.0 microns.

17. The magnetic multilayer composite of claim 1, wherein the inner magnetic layer comprises a permeability rating (X, Y) where X is within the range of 10 MHz to 10 GHz and Y is at least about 100.

18. The magnetic multilayer composite of claim 1, wherein the inner magnetic layer comprises a permeability rating (X, Y) where X is within the range of 10 MHz to 10 GHz and Y is not greater than about 5000.

19. A magnetic multilayer composite comprising:

a core substrate layer, an outer magnetic layer overlying a first surface of the core substrate layer, and an inner magnetic layer underlying a second surface of the core substrate layer opposite of the first surface of the core substrate layer, wherein the composite comprises a magnetic layer thickness ratio $T_M/T_S$ of at least about 0.005, where $T_M$ is equal to the total thickness of the outer magnetic layer and the inner magnetic layer and $T_S$ is the total thickness of the substrate, and wherein the composite comprises a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHZ, and Y is greater than 100.

20. An antenna comprising a magnetic multilayer composite, wherein the magnetic multilayer composite comprises:

a core substrate layer, an outer magnetic layer overlying a first surface of the core substrate layer, and an inner magnetic layer underlying a second surface of the core substrate layer opposite of the first surface of the core substrate layer, wherein the composite comprises a magnetic volume ratio $V_M/V_S$ of at least about 0.005, where $V_M$ is equal to the total volume of magnetic material in the composite and $V_S$ is the total volume of substrate, and wherein the composite comprises a permeability rating (X, Y), where the permeability rating (X, Y) is equal to a peak point (X, Y) along a plot of the imaginary part of magnetic permeability (μ") of the composite plotted as a function of frequency, where X is within the range of 10 MHz to 10 GHz, and Y is greater than 100.

* * * * *